United States Patent [19]

Heine et al.

[11] 4,093,777

[45] June 6, 1978

[54] COATED STABILIZED CADMIUM CHALCOGENIDE PIGMENTS

[75] Inventors: Heinrich Heine; Peter Woditsch, both of Krefeld; Theodor Bohmann, Leverkusen; Dieter Räde, Krefeld, all of Germany

[73] Assignee: Bayer Aktiengesellschaft, Leverkusen, Germany

[21] Appl. No.: 620,092

[22] Filed: Oct. 6, 1975

[30] Foreign Application Priority Data

Oct. 10, 1974 Germany .............................. 2448338

[51] Int. Cl.$^2$ .............................................. B32B 9/04
[52] U.S. Cl. ............................... 428/403; 428/404; 428/407; 428/448; 428/450; 428/451; 428/538; 427/215; 427/218; 427/219
[58] Field of Search ............... 428/403, 404, 538, 448, 428/450, 451, 407; 427/215, 218, 219

[56] References Cited

U.S. PATENT DOCUMENTS

| | | | |
|---|---|---|---|
| 2,003,849 | 6/1935 | Alton | 427/219 |
| 2,326,984 | 8/1943 | Tomlin | 428/403 |
| 3,309,215 | 3/1967 | Brader, Jr. et al. | 428/538 X |
| 3,362,846 | 1/1968 | Lee et al. | 427/215 |
| 3,652,327 | 3/1972 | Hill, Jr. et al. | 428/538 X |
| 3,904,409 | 9/1975 | Hanada et al. | 428/403 X |

*Primary Examiner*—P. C. Ives
*Attorney, Agent, or Firm*—Burgess, Dinklage & Sprung

[57] ABSTRACT

A stabilized cadmium chalcogenide, in which optionally zinc and/or mercury is present in the lattice, carrying at least one coating of a sparingly-soluble sulfide is produced by adding at least one water-soluble salt of an element forming a sparingly-soluble sulfide to an aqueous chalcogenide suspension, mixing with a compound releasing sulfide ions and/or mixing the cadmium chalcogenide suspension with a soluble thio-compound of an element forming a sparingly-soluble sulfide thereby to precipitate a sparingly-soluble sulfide onto the chalcogenide, subsequently filtering, optionally washing, drying and annealing the aftertreated chalcogenide. Suitable sparingly-soluble sulfides are, for example, the sulfides of the elements Zn, Hg, In, Sn, Pb, As, Sb, Bi, V, Mo, W, Cu and Ag.

7 Claims, No Drawings

COATED STABILIZED CADMIUM CHALCOGENIDE PIGMENTS

The present invention relates to stabilizing cadmium chalcogenides, i.e. compounds with sulfur and/or selenium.

Cadmium chalcogenides exhibit a certain degree of solubility when treated with dilute hydrochloric acid. This undesirable phenomenon is likewise to be observed when some of the cadmium ions are replaced by the corresponding molar amount of zinc and/or mercury, i.e. up to about 20% by weight and especially up to about 15%, e.g. about 1 to 10%.

It is accordingly an object of the invention to provide cadmium chalcogenides which will exhibit a reduced tendency to dissolve away in dilute hydrochloric acid.

This and other objects and advantages are realized in accordance with the present invention pursuant to which there are provided stabilized cadmium chalcogenides, in which zinc and/or mercury may optionally be present in the lattice, carrying a coating of at least one sparingly-soluble sulfide.

The present invention furthermore extends to a process for the production of stabilized cadmium chalcogenides, optionally containing zinc and/or mercury in the lattice, comprising adding water-soluble salts of elements forming sparingly-soluble sulfides to aqueous cadmium chalcogenide suspensions, mixing with compounds releasing sulfide ions and/or mixing the cadmium chalcogenide suspensions with soluble thio-compounds of elements forming sparingly-soluble sulfides and precipitating sparingly-soluble sulfides onto the chalcogenides, subsequently filtering, optionally washing, drying and annealing the aftertreated chalcogenides.

The sulfides to be used for preparing coatings in accordance with the invention are as sparingly-soluble as or more sparingly-soluble than zinc sulfide. Suitable, for example, are the sulfides of the elements Zn, Hg, In, Sn, Pb, As, Sb, Bi, V, Mo, W, Cu and Ag, provided they are produced in an aqueous solution. There may be mentioned as preferably suitable and sulfides of Zn, In, Sb and Sn, and as especially preferred Zn and In. In addition, one or several insoluble layers on the basis of $SiO_2$, sparingly-soluble phosphates and/or sparingly-soluble silicates may be optionally coated on the sulfide layer or sulfide layers, in order to effect mechanical stabilization of the metal sulfides.

In a preferred embodiment of the process in accordance with the invention, the chalcogenide is suspended in water while stirring and bringing the solids concentration to about 200 to 500 g per liter. Lower solids concentrations are likewise possible, but involve more highly sophisticated reaction and filtration aggregates. The sulfide to be used as a coating is produced in the aqueous phase from water-soluble salts of the elements which are to be precipitated as sulfide. As water-soluble salts there are preferably employed chlorides or sulfates of the following metals: Zn, Hg, In, Sn, Pb, As, Sb, Bi, V, Mo, W, Cu and Ag. In addition, nitrates, silico fluorides, boron fluorides, perchlorates and salts or organic acids are also useable. Hydrolyzing salts, such as, for example the halides of As, Sb, or Bi are dissolved by adding a little acid. It is also possible to obviate difficulties involved in hydrolysis by employing complex salts, such as, for example, potassium antimonyl tartrate. The metal ions to be employed can be converted to sulfides by introducing $H_2S$ gas into the suspension, or in accordance with a preferred embodiment of the invention, soluble sulfides, such as $Na_2S$ or $(NH_4)_2S$, as used as donors for $S^{2-}$ions; the other alkali metal sulfides and alkaline earth metal sulfides are likewise useable. In accordance with a further embodiment of the invention, the metals are precipitated with the aid of organic compounds which release $H_2S$, such as, for example, thioacetamide, hydrogen sulfide-containing gases giving rise to very slight inconvenience.

A few elements, such as, for example, As, Sb, Sn, Mo, W and V, are likewise preferably precipitated from their soluble thio salts as sulfides on the cadmium compounds. Examples of such soluble thio salts are $Na_3VS_4$, $Na_2WS_4$, $Na_2MoS_4$, $Na_3AsS_3$, $Na_3AsS_4$, $Na_2SnS_3$, $Na_3SbS_3$ and $Na_3SbS_4$, as well as analogous compounds having ammonium or potassium ions instead of sodium ions.

This may be carried out, for example, by simple acidification of the alkaline suspension of thio salt and cadmium chalcogenide. Of course, the elements can be used for coating as sulfides either individually or in admixture; for certain purposes it may be desirable to coat the elements in succession, with or without intermediate separation, and optionally to dry or anneal the chalcogenide.

Aftertreatment of the cadmium chalcogenide compounds can be concluded by coating with one or several of the sulfides, but it may be of advantage, as regards increasing the resistance to weathering, to follow this up by aftertreatment with $SiO_2$, silicates or phosphates. For this purpose, solutions of phosphates or silicates as well as metal ions, which form sparingly-soluble precipitates with phosphates or silicates are added to the suspension of the starting compound either in succession or simultaneously. As examples there may be mentioned: $Mg^{2+}$, $Ca^{2+}$, $Sr^{2+}$, $Ba^{2+}$, $Zn^{2+}$, $Cd^{2+}$, $Al^{3+}$, $Mn^{2+}$, $Ti^{4+}$ and $Zr^{4+}$. Mineral acids, preferably sulfuric acid, are used to precipitate insoluble silicic acid.

The cadmium chalcogenides which have been aftertreated according to the invention can carry the sulfide in about 0.01 to 10% by weight, based on the chalcogenide. Whenever it is intended to use the cadmium chalcogenides as pigments, the amount to be used will depend on the intensity of the intrinsic coloration of the foreign sulfide. In the enveloping of cadmium chalcogenides the amount of sulfide employed of, for example, Sb, In, $Sn^{IV}$ and Zn is largely unimportant in respect of color even if it should exceed 10%; however, very dark-colored sulfides should preferably be employed in amounts less than about 0.2%, preferably about 0,01 to 0.1%. The preferred concentration for light-colored sulfides is about 0.5 to 2.0% by weight. The amount of phosphates, silicates or silicic acid to be used for coating is about 1 to 10% by weight, preferably about 2 to 5% by weight, based on the chalcogenide.

After coating in accordance with the invention with the sulfides and, optionally $SiO_2$, sparingly-soluble phosphates and/or silicates, the chalcogenides are filtered off, washed and dried. This may be followed by continuous or discontinuous annealing at about 100° to 400° C,. and thereafter grinding.

The chalcogenides stabilized in accordance with the invention are excellent pigments, in particular for coloring lacquers and plastics, e.g. about 0.1 to 50% by weight, for example about 0.5% by weight of the product of Example 7 hereinbelow in polyethylene.

The invention is further described in the following illustrative examples. In these examples DIN test 53 770 is employed to detect any tendency to release soluble cadmium. For this purpose, 10 g of chalcogenide together with 150 ml of 0.1 N HCl are introduced into a 250 ml Erlenmeyer flask and agitated for 15 minutes at 23° C by turning. The suspension is then left to stand for 10 minutes. Thereafter the solution is filtered by decanting off over a membrane filter (pore size = 0.15 μm). Filtration is completed after 5 minutes. An atom absorption photometer is used to determine the cadmium in the filtrate.

The following cadmium chalcogenides were used as starting products for the stabilization treatment in accordance with the invention.

(A) Pure cadmium sulfide was precipitated out of a solution of 453 g of $CdSO_4$ in 18 liters of water by means of sodium sulfide. The precipitate was washed and annealed in an inert atmosphere at 600° C. After cooling, the product was ground in a disc attrition mill. The size of the particles was 0.05 to 5 μm. The product is identified hereinbelow as chalcogenide A. The solubility of cadmium according to DIN 53 770 was 600 ppm.

(B) Cadmium sulfo- selenide was prepared from freshly precipitated and washed cadmium carbonate by reaction with a sodium sulfide solution in which metallic selenium had been dissolved. Stirring was carried out for a further 2 hours at 50° C and the chalcogenide precipitate washed until free of alkali metal. Drying was followed by annealing at 650° C with the exclusion of air. Grinding was performed in a disc attrition mill. The size of the particles was 0.05 to 5.0 μm. The product is referred to as chalcogenide B hereinbelow. It contains approximately 18% of selenium. The solubility of cadmiun according to DIN 53 770 was 700 ppm.

(C) A zinc cadmium sulfide was prepared as indicated in A; 9.5% by weight of the cadmium was replaced by zinc. The size of the particles was 0.05 to 5 μm. The product is identified as chalcogenide C hereinbelow. The solubility of cadmium according to DIN 53 770 was 250 ppm.

(D) A cadmiun/mercury/sulfide was prepared as follows: 7.05 g of mercury sulfide and 26 g of sodium thiosulfate pentahydrate were added to 20 g of pure, calcined cadmium sulfide. The mixture was ground in the dry state, water then added to form a paste and thereafter dried at 200° C. It was then ground, introduced into a crucible and closed with a lid. The crucible was heated in an electric oven for 20 minutes to 550° C. The hot contents of the crucible were submitted to sudden cooling in water. The resulting suspension was stirred until all lumps had disintegrated. The mixed sulfide was then filtered, washed and dried at 105° C. It is identified as chalcogenide D hereinbelow. The solubility of cadmium according to DIN 53 770 was 270 ppm.

EXAMPLE 1 (AFTERTREATMENT USING ONLY Al PHOSPHATE)

200 g of chalcogenide B were suspended in 600 ml of water and heated to 50° C. Thereafter, a solution of alkaline Al nitrate and of disodium hydrogen phosphate were simultaneously added dropwise within 3 hours at pH of 6.5 while stirring, the amounts corresponding to a concentration of 2% $AlPO_4$ based on the cadmium pigment. By adding 1 N sodium hydroxide solution the pH value was adjusted to 7 and the mixture stirred for another 30 minutes. This step was followed by filtering off, washing with 4 times the amount of water and drying at 110° C. The finished product was comminuted in an agate mortar. Analysis for soluble cadmium according to DIN 53 770 revealed 670 ppm of cadmium.

EXAMPLE 2 (AFTERTREATMENT USING ONLY Al PHOSPHATE)

The same experiment was performed as in Example 1 using chalcogenide A.

Analysis for soluble cadmium according to DIN 53 770 revealed 630 ppm of cadmium.

EXAMPLE 3 (AFTERTREATMENT USING ONLY $SiO_2$)

200 g of chalcogenide A were suspended in 700 ml of water. Sodium silicate (concentration 360 g of $SiO_2$ per liter) were added dropwise to this suspension while stirring until 4% of $SiO_2$, based on CdS, were present. The temperature of the mixture was then raised to 85° C and the pH value adjusted to 7.0 by the dropwise addition of 0.1 N HCl over a period of 2 hours. The mixture was stirred for another 30 minutes at 85° C, the product filtered off, washed and dried at 110° C. The finished product was comminuted in the agate mortar of Example 1.

Analysis for soluble cadmium according to DIN 53 770 revealed 490 ppm.

EXAMPLE 4

200 g of chalcogenide B were suspended in 700 ml of water. The suspension was heated to 50° C while stirring and $H_2S$ intrduced in a slow stream. 100 ml of an indium chloride solution containing a total amount of 1 g of indium were added dropwise over a period of 90 minutes. The mixture was stirred for another 60 minutes at 50° C, the product filtered off, washed and dried at 110° C. The finished product was comminuted in the agate mortar.

Analysis for soluble cadmium according to DIN 53 770 revealed considerably less than 100 ppm.

EXAMPLE 5

200 g of chalcogenide A were suspended in 700 ml of water, 4 g of thioacetamide added and the suspension heated to 50° C. 50 ml of an indium chloride solution, corresponding to 1 g of indium, were added dropwise to this suspension over a period of 90 minutes, while stirring. The mixture was then stirred for another hour, the product filtered off and dried at 110° C. The finished product was comminuted in the agate mortar. Analysis for soluble cadmium according to DIN 53 770 revealed well below 100 ppm.

EXAMPLE 6

100 g of chalcogenide A were suspended in 700 ml of water. The suspension was heated to 50° C and 100 ml of an indium chloride solution corresponding to 5 g of indium were then added. $H_2S$ was then passed through the solution for 3.5 hours while stirring continously. The mixture was stirred for another hour at 50° C, the product filtered off and dried at 110° C. The finished product was comminuted in the agate mortar. Analysis for soluble cadmium according to DIN 53 770 revealed well below 100 ppm.

EXAMPLE 7

A two-liter flask was employed in which to suspend 200 g of chalcogenide A in 800 ml of water and the suspension heated to 50° C. 60 ml of an indium chloride solution containing a total of 1 g of indium, were added to this solution and hydrogen sulfide introduced for 2.5 hours while stirring. The mixture was then stirred for a further 30 minutes, the pH valve adjusted to 6.0 with sodium hydroxide solution and two aqueous solutions, (a) and (b) as defined below were simultaneously added dropwise at a pH value of 5.5 to 6.0;

(a) 41.8 ml of aluminum sulfate solution (with 100 g of $Al_2O_3$ per liter)diluted to 150 ml, (b) 49.4 g of $Na_2HPO_4 \cdot 12 H_2O$, dissolved to 150 ml. Sodium hydroxide solution was employed to correct fluctuations in the pH value. After addition to solutions (a) and (b), the pH value was adjusted over a period of one hour to 7.5. The mixture was stirred for a further 30 minutes, the product filtered off, washed and dried at 105° C. The finished product was comminuted in the agate mortar.

Analysis for soluble cadmium according to DIN 53 770 revealed considerably less than 100 ppm.

EXAMPLE 8

200 g of chalcogenide A were mixed with water to produce a 20% suspension, heated to 80° C and 2 g of thioacetamide added. An antimony trichloride solution containing 20 mg of antimony was then added dropwise over a period of 90 minutes, while stirring. The mixture was stirred for a further 30 minutes at 50° C, the product filtered off, washed and dried at 120° C. The finished product was comminuted in the agate mortar.

Analysis for soluble cadmium according to DIN 53 770 revealed considerably less than 100 ppm.

EXAMPLE 9

200 g of chalcogenide B were suspended in 700 ml of water, heated to 50° C and a solution of ammonium thioantimonate, corresponding to 0.2 g of antimony, added dropwise to the suspension. The alkaline-reacting suspension was adjusted with dilute hydrochloric acid to a pH value of 2.1 over a period of 2 hours and stirring continued at this value for another 30 minutes. The product was filtered off, washed and dried at 110° C. Analysis for soluble cadmium according to DIN 53 770 revealed 130 ppm.

EXAMPLE 10

200 g of chalcogenide A were suspended in 700 ml of water and tartar emetic, corresponding to 200 mg of antimony, then added. The suspension was heated to 50° C and hydrogen sulfide introduced in a slow stream for 2.5 hours. The mixture was stirred for 10 minutes, the product filtered off, washed and dried at 105° to 110° C. The finished product was comminuted in an agate mortar. Analysis for soluble cadmium according to DIN 53 770 revealed considerably less than 100 ppm.

EXAMPLE 11

200 g of chalcogenide B were suspended in 600 ml of water, heated to 50° C and a zinc chloride solution, corresponding to 1 g of zinc, then added. $H_2S$ was introduced in a slow stream for a period of 90 minutes, while stirring, and stirring continued for another 30 minutes. The suspension was adjusted to a pH value of 6.5 with sodium hydroxide solution. A disodium hydrogen phosphate solution and the solution of a basic aluminum nitrate were simultaneously added dropwise at this pH value. The amounts were so regulated that 2% of aluminum phosphate (based on the starting compound) formed in the course of 2 hours. Stirring was continued for 30 minutes, the pH value finally adjusted to 7.5, the product filtered off, washed and dried at 105° C. The finished product was comminuted in the agate mortar. Analysis for soluble cadmium according to DIN 53 770 revealed considerably less than 100 ppm.

EXAMPLE 12

200 g of chalcogenide B were suspended in 600 ml of water, heated to 50° C and a zinc chloride solution corresponding to 1 g of zinc, then added. Hydrogen sulfide was introduced in a slow stream for 90 minutes, while stirring. The mixture was then stirred for another 30 minutes and the solution then adjusted to pH value of 6.5. Two solutions were simultaneously added dropwise at this pH value: a disodium hydrogen phosphate solution and an aluminum nitrate solution (approx. $Al(OH)_2 NO_3$). The rate at which the solutions were added dropwise was so regulated that 2% of $AlPO_4$, based on the CdS, were produced over a period of two hours. The suspension was stirred for a further 30 minutes. The filtered and washed product was dried at 105° C. Thereafter comminution was performed in the agate mortar.

Analysis for soluble cadmium according to DIN 53 770 revealed considerably less than 100 ppm.

EXAMPLE 13

200 g of chalcogenide A were suspended in 700 ml of water and 4 g of thioacetamide then added. The suspension was heated to 80° C while stirring and tin (II)-chloride solution, corresponding to 1 g of tin, then added dropwise over a period of 90 minutes. Stirring was continued for 30 minutes, the product then filtered off, washed and dried at 120° C. The finished product was comminuted in the agate mortar.

Analysis for soluble cadmium according to DIN 53 770 revealed 110 ppm.

EXAMPLE 14

200 g of chalcogenide B were suspended in 700 ml of water and treated with 1 g of thioacetamide. The suspension was heated to 80° C and a mercury chloride solution, corresponding to 200mg of mercury, added dropwise over the course of 90 minutes. The mixture was then stirred for another hour, the product filtered off, washed and dried at 110° C. The finished product was comminuted in the agate mortar.

Analysis for soluble cadmium according to DIN 53 770 revealed considerably less than 100 ppm.

EXAMPLE 15

A bismuth tartrate solution was prepared for use in aftertreatment by mixing with bismuth chloride and tartaric acid and adjusting to a pH value of 7.0 with 1 N sodium hydroxide solution. Part of the bismuth remained in complex form in solution. 200 g of chalcogenide A were suspended in 700 ml of water, the suspension heated to 50° C and treated with bismuth tartrate solution corresponding to 0.2 g of bismuth. Hydrogen sulfide was then slowly introduced into the suspension over a period of two hours, while stirring. The mixture was then heated to 80° C and finally stirred for one hour at 50° C. The product was then filtered off, washed and dried at 105° C. The finished product was comminuted in the agate mortar.

Analysis for soluble cadmium revealed considerably less than 100 ppm.

EXAMPLE 16

200 g of chalcogenide A were suspended in 800 ml of water and heated to 50° C. A thiomolybdate solution containing 0.2 g of molybdenum was added dropwise to this suspension over the course of 30 minutes. The suspension, which was now alkaline, was adjusted to a pH value of 1.5 with dilute sulfuric acid over the course of 2 hours. The molybdenum precipitated in its entirety as molybdenum sulfide. Stirring was continued for one hour, the product then filtered off, washed and dried at 105° C. The finished product was comminuted in the agate mortar. Analysis for soluble cadmium according to DIN 53 770 revealed considerably less than 100 ppm.

EXAMPLE 17

Work was carried out as in Example 16 except that 0.2 g of tungsten were employed instead of 0.2 g of molybdenum. Analysis for soluble cadmium according to DIN 53 770 revealed considerably less than 100 ppm.

EXAMPLE 18

In an aftertreatment as described in Example 16, 0.2 g of vanadium were used instead of 0.2 g of molybdenum. Analysis for soluble cadmium according to DIN 53 770 revealed considerably less than 100 ppm.

EXAMPLE 19

A thioarsenate solution was prepared for later use as follows: $As_2O_3$ was dissolved in dilute hydrochloric acid, $H_2S$ introduced, the resultant $As_2S_3$ filtered off, washed and dissolved in sodium sulfide solution with the addition of sulfur. 200 g of chalcogenide A were suspended in 800 ml of water. 100 ml of thioarsenate solution were added (corresponding to 0.1% of As, based on CdS) and the suspension adjusted to a pH value of 4.0 with dilute hydrochloric acid within a period of two hours. The product was filtered off, washed and dried at 105° C.

Analysis for soluble cadmium according to DIN 53 770 revealed 160 ppm.

EXAMPLE 20

A thiostannate solution was prepared for later use as follows: Freshly precipitated SnS was dissolved in sodium sulfide with the addition of elementary sulfur to form a clear thiostannate solution.

200 g of chalcogenide A were suspended in 800 ml of water. Sodium thiostannate solution, corresponding to 0.1% Sn (based on CdS) was then added and the mixture adjusted to a pH value of 3 to 4 by stirring in dilute hydrochloric acid within two hours. The mixture was stirred for another 30 minutes, the product filtered off, washed and dried at 105° C. The finished product was comminuted in the agate mortar.

Analysis for soluble cadmium according to DIN 53 770 revealed considerably less than 100 ppm.

EXAMPLE 21

200 g of chalcogenide A were suspended in 800 ml of water and heated to 50° C. $H_2S$ was then introduced and lead nitrate corresponding to 0.05% of lead (based on CdS), added dropwise over a period of about two hours. The mixture was then stirred for another 30 minutes, the product filtered off, washed and dried at 105° C. The finished product was comminuted in the agate mortar.

Analysis for soluble cadmium according to DIN 53 770 revealed considerably less than 100 ppm.

EXAMPLE 22

A two-liter flask was employed in which to suspend 200 g of chalcogenide A in 800 ml of water and heated to 50° C. Hydrogen sulfide was introduced and silver nitrate, corresponding to 0.05% of Ag (based on CdS) added over a period of 2 hours. The mixture was stirred for a further 30 minutes, the product filtered off, washed and dried at 105° C. The finished product was comminuted in the agate mortar.

Analysis for soluble cadmium according to DIN 53 770 revealed considerably less than 100 ppm.

EXAMPLE 23

40 g of chalcogenide D were suspended in 500 ml of water, heated to 50° C and zinc chloride (corresponding to 0.5% of zinc, based on the starting compound) then added. $H_2S$ was introduced for 2.5 hours, stirring continued for another 30 minutes, the product filtered off, washed and dried at 105° C. The finished product was comminuted in the agate mortar.

Analysis for soluble cadmium according to DIN 53 770 revealed less than 200 ppm.

EXAMPLE 24

200 g of chalcogenide B were suspended in 800 ml of water and treated with a mixture of indium chloride and zinc chloride (corresponding to 0.25% of indium and 0.25% of zinc based on CdS). Hydrogen sulfide was introduced over a period of 2 hours, stirred for another 30 minutes, the product filtered off, washed and dried at 105° C. The finished product was comminuted in the agate mortar.

Analysis for soluble cadmium according to DIN 53 770 revealed considerably less than 100 ppm.

EXAMPLE 25

200 g of chalcogenide B were suspended in 800 ml of water, heated to 50° C and a solution of indium chloride (corresponding to 0.5% of indium, based on CdS) then added. Thereafter, $H_2S$ was introduced in a slow stream for a period of two hours. While continuing to introduce $H_2S$, potassium antimonyl tartrate (corresponding to 0.1% of antimony) was added dropwise over a period of 90 minutes. The mixture was stirred for another hour, the product filtered off, washed and dried at 105° C. The finished product was comminuted in the agate mortar.

Analysis for soluble cadmium according to DIN 53 770 revealed considerably less than 100 ppm.

EXAMPLE 26

100 g of chalcogenide A were suspended in 700 ml of water, heated to 50° C, and indium chloride (corresponding to 5% of indium, based on CdS) then added. $H_2S$ was then conducted through the solution for 3.5 hours. The solution was then stirred for another hour, the product filtered off, washed and dried at 105° C. The finished product was comminuted in the agate mortar. Analysis for soluble cadmium according to DIN 53 770 revealed considerably less than 100 ppm.

EXAMPLE 27

200 g of chalcogenide were suspended in 800 ml of water, heated to 50° C and indium chloride, corresponding to 0.5% of indium (based on CdS) then added.

Hydrogen sulfide was conducted in a slow stream through the solution for a period of 2.5 hours; it was then stirred for a further 30 minutes and adjusted to a pH value of 6.0 by adding sodium hydroxide solution. An aluminum sulfate solution and an alkaline sodium phosphate solution were simultaneously added dropwise at a pH value of 5.5 to 6.0. The amounts of these solutions corresponded to a precipitation of 5% of AlPO$_4$ (based on the starting compound). The solution was then adjusted within one hour to a pH value of 7.5, stirred for a further hour, the product filtered off, washed and dried at 105° C. The finished product was comminuted in the agate mortar. Analysis for soluble cadmium according to DIN 53 770 revealed less than 100 ppm.

It will be appreciated that the instant specification and claims are set forth by way of illustration and not limitation, and that various modifications and changes may be made without departing from the spirit and scope of the present invention.

What is claimed is:

1. A coated stabilized cadmium chalcogenide pigment carrying a coating of at least one sparingly-soluble sulfide.

2. A cadmium chalcogenide according to claim 1, selected from the group consisting of cadmium sulfide, cadmium selenide, cadmium sulfo-selenide and mixtures thereof.

3. A cadmium chalcogenide according to claim 1, wherein up to about 20% of the cadmium in the lattice is replaced by at least one member selected from the group consisting of zinc and mercury.

4. A cadmium chalcogenide according to claim 1, wherein the coating comprises about 0.01 to 10% by weight of the chalcogenide of at least one sulfide of a member selected from the group consisting of zinc, mercury, indium, tin, lead, arsenic, antimony, bismuth, vanadium, molybdenum, tungsten, copper and silver.

5. A cadmium chalcogenide according to claim 1, further carrying a coating in about 0.1 to 10% by weight of the chalcogenide of at least one member selected from the group consisting of SiO$_2$, a sparingly-soluble phosphate and a sparingly-soluble silicate.

6. A cadmium chalcogenide according to claim 2, wherein up to about 15% of the cadmium in the lattice is replaced by at least one member selected from the group consisting of zinc and mercury, the coating comprises about 0.01 to 2% by weight of the chalcogenide of at least one sulfide of a member selected from the group consisting of zinc, indium, tin and antimony, and carrying a further coating in about 1 to 5% by weight of the chalcogenide of at least one member selected from the group consisting of SiO$_2$, a sparingly-soluble phosphate and a sparingly-soluble silicate.

7. In a lacquer or plastic pigmented with about 0.1 to 50% by weight of cadmium chalcogenide, the improvement wherein said cadmium chalcogenide is a coated pigment according to claim 1, whereby the pigment is stabilized against leaching out therefrom of cadmium.

* * * * *